United States Patent Office 2,749,351
Patented June 5, 1956

2,749,351

PROCESS FOR THE PRODUCTION OF PYRIDINE ALDEHYDES AND PYRIDOINES

Wilhelm Mathes and Walter Sauermilch, Ludwigshafen (Rhine), Germany, assignors to Dr. F. Raschig G. m. b. H., Ludwigshafen (Rhine), Germany No Drawing. Application September 4, 1953, Serial No. 378,677

6 Claims. (Cl. 260—297)

The present invention relates to an improved process for the production of pyridine aldehydes and the dimerization products thereof, namely, pyridoines, by the controlled oxidation of methyl pyridines in the vapor phase in accordance with the following equations.

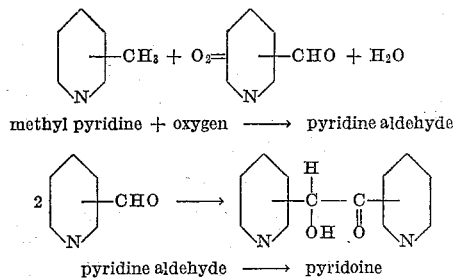

methyl pyridine + oxygen ⟶ pyridine aldehyde pyridine aldehyde ⟶ pyridoine

Pyridine aldehydes have only previously been prepared in small laboratory quantities with poor yields. For example, Harries (Annalen 410, 95 (1915), and Lénárt Berichte 47: 808–810 (1914) produced alpha pyridine aldehyde from stilbazole and ozone and L. Pannizon (Helv. chim. Acta 24, 24E (1941) isolated a low yield of beta pyridine aldehyde from the benzene sulfonyl derivative of nicotinic acid hydrazide. No process for the production of commercial quantities of pyridine aldehydes has been proposed. While it has already been proposed to oxidize methyl pyridines partially, such oxidations were not carried out so as to produce pyridine aldehydes or pyridoines. For example, in accordance with U. S. Patent No. 2,300,741, partial oxidation of the technical β picoline fraction obtained from coal tar was employed to obtain β picoline and the carboxylic acids of gamma picoline and 2.6 lutidine. Also, U. S. Patent No. 2,437,-938, and Lewis and Brown (Ind. and Eng. 36, p. 893 (1944), also only disclose the exclusive production of pyridine carboxylic acids upon partial oxidation of methyl pyridines.

In accordance with U. S. Patents Nos. 2,300,741 and 2,437,938, the reaction was carried out with extremely large excesses of oxygen or air, namely, 13.6 times and more of the quantity theoretically required for the production of the pyridine carboxylic acids. The space velocities employed amounted to between 2000–4000 and the apparatus employed consisted of iron and iron containing catalysts also were suggested for the oxidation. The use of steam as well as carbon dioxide and nitrogen have been indicated as equally suitable as diluents for the oxygen containing mildly oxidizing gas employed.

Lewis and Brown, on the other hand, investigated the influence of using different quantities of air in the range of those containing 1 to 9 moles of oxygen per mol of methyl pyridine. The authors employed vanadates, including iron vanadate for the partial oxidation of methyl pyridines. The methyl pyridines were not oxidized in the presence of steam, but rather were carefully dried before being subjected to the oxidation. The reaction products obtained essentially consisted of carbon dioxide and relatively minor quantities of pyridine carboxylic acids.

In none of these prior disclosures indicated above was the production of pyridine aldehydes mentioned and furthermore, a repetition of the examples given confirms that pyridine aldehydes were in no instance produced.

It has now surprisingly been discovered that methyl pyridines can be oxidized in the vapor phase with oxygen containing gases to produce good yields of pyridine aldehydes provided certain conditions are observed for such oxidation. In accordance with the invention, it was found necessary to carry out such oxidation in the presence of steam. Also, in order to obtain the desired pyridine aldehydes in good yields, it is expedient to keep the reaction zone free of iron oxide or copper oxide or iron and copper in such form that they are capable of forming such oxides. It was found that the addition of certain quantities of steam to the reaction mixture have an extremely favorable effect upon the quantity of pyridine aldehydes that can be recovered in the partial oxidation of methyl pyridines. On the other hand, the presence of iron oxide or copper oxide substantially accelerates the undesired formation of carbon dioxide and consequently lowers the yields of pyridine aldehydes obtainable.

The above-mentioned requirements, however, in themselves do not suffice to achieve the desired production of pyridine aldehydes. It has also been found necessary to employ substantially lower quantities of oxygen or air than was heretofore customary for the production of pyridine carboxylic acids. The use of only very limited quantities of oxygen is of extreme importance when the partial oxidation of methyl pyridines is carried out with only limited quantities of steam present or when low space velocities are to be employed. The three variables: quantity of water added, quantity of air or oxygen and space velocity have such a relationship that improved yields of the desired aldehydes are obtained with increasing quantities of water and increased space velocities as well as with decreasing quantities of oxygen.

The following formula indicates the largest quantity of oxygen permissible with reference to the quantity of water added as well as the space velocity employed:

$$X = (4.06 - 2.02 \cdot \log p) \cdot (S + 1.4)$$

wherein X represents the number of moles of $O_2$ permissible per mol of methyl pyridine employed, $p$ the percent by weight of methyl pyridine in the methyl pyridine-steam mixture (taken as a whole number) and S is the space velocity employed divided by 10,000. (By space velocity, we mean the total volume of gas, measured at 0° C. and 760 mm. Hg, in ccm. per hour divided by the volume of the catalyst in ccm.)

For example, in accordance with such formula when employing a mixture of methyl pyridine and water containing 50% by weight of each, the greatest quantity of oxygen permissible per mol of methyl pyridine is 1.2 at a space velocity of 5,000, 2.2 at a space velocity of 20,000 and 3.4 at a space velocity of 40,000.

The catalysts employed for the process according to the invention are those suggested in the literature, namely, oxides of metals of subgroup A of the V, VI and VII groups of the periodic system. The catalysts can be applied to carriers such as pumice, silica gel and alumina in order to increase their surface area. As the presence of iron oxide or copper oxide is detrimental to the production of pyridine aldehyes, it is preferable that the catalysts and carriers be freed of such oxides and also that the reactors in which reaction is to take place are free of such oxides as well as iron and copper in such form that oxides are produced under the conditions of the reaction. For example, ordinary iron and steel reactors have been found to have a detrimental effect upon the production of the pyridine aldehydes.

Elevated temperatures between 250° C. and 450° C., preferably between 370° C. and 430° C., are employed for the partial oxidation of methyl pyridines to pyridine aldehydes according to the invention.

The term methyl pyridine is employed herein to designate pyridine compounds carrying one or more methyl groups on the pyridine nucleus. They can be used individually or in admixture as the starting materials.

In accordance with the invention, pyridine-2-aldehyde, pyridine-3-aldehyde and pyridine-4-aldehyde and the corresponding pyridoines can respectively be obtained from the $\alpha$, $\beta$ and $\gamma$ picolines. 6 methyl pyridine-2-aldehyde as well as 2,6 pyridine dialdehyde can be obtained from 2,6 dimethyl pyridine (lutidine). A mixture of pyridine aldehydes which can be separated by fractional distillation and/or by the process described in U. S. application Serial No. 292,748, filed June 10, 1952, now Patent No. 2,698,328 can be obtained according to the invention from technical $\beta$ picoline which also contains $\gamma$ picoline and 2,6 lutidine.

The most preferred conditions for carrying out the process according to the invention are the use of —.2 to 4 moles of oxygen per mol of methyl pyridine, space velocities between 10,000 and 40,000, and quantities of steam which are 85–97 percent by weight of the steam-methyl pyridine mixture employed.

In addition to the necessary addition of steam to the reaction mixture, inert diluents such as nitrogen or carbon dioxide can be added to the reaction mixture.

In carrying out the process according to the invention the pyridine aldehydes are the primary products of the reaction, which aldehydes readily dimerize to the pyridoines. The lower the quantity of the steam present during the reaction, the more rapid the aldehydes dimerize into pyridoines.

When the reaction is carried out with a methyl pyridine steam mixture containing 50% of steam, it suffices to let the reaction mixture leaving the reactor to stand for 30–60 minutes at 50° to 60° C. to obtain pyridoines. The formation of pyridoines slows down with increasing dilution with steam so that considerable dilution with steam favors the recovery of unchanged pyridine aldehydes.

The following examples will serve to illustrate the manner in which the process according to the invention can be carried out.

*Example 1*

The vapors of 350 cubic centimeters of a 5% aqueous solution of $\alpha$-picoline in admixture with 50 liters of air were passed at 410° C. per hour over 100 cubic centimeters of a catalyst composed of 90% silica gel and 10% of a 30/70 mixture of $MoO_3$ and $V_2O_5$ disposed in an aluminum reactor. The vapors leaving the catalyst were condensed, and a deep blue liquid smelling strongly of pyridine aldehyde was obtained. The distillate was acidified to a pH of 3.5 and concentrated by vacuum distillation to an oily consistency. The resultant liquid was treated with sodium carbonate to free the pyridine aldehyde, and the salt formed was filtered off. The filtrate was shaken up with ether. Upon distillation pure pyridine aldehyde of a boiling point of 70–71° C. at 16 mm. Hg was obtained (5 g. per hour).

In a similar manner:

6 methyl pyridine-2-aldehyde having a boiling point of 77°–78° C. at 12 mm. Hg and a melting point of 30° C. was obtained from 2.6-lutidine.

$\gamma$-pyridine aldehyde having a boiling point of 81°–82° C. at 12 mm. Hg was obtained from $\gamma$-picoline.

A mixture of $\beta$ pyridine aldehyde, $\gamma$ pyridine aldehyde and 6-methyl-$\gamma$-pyridine aldehyde having a boiling point of 70°–81° C. at 11 mm. Hg was obtained from technical "$\beta$ picoline."

When a catalyst composed of 50 ccm. of silica gel containing 7 g. of $V_2O_5$ and 3 g. $MoO_3$ was employed with 35 liters of air per hour and the remaining conditions of the example were maintained the same, a somewhat improved yield of pyridine aldehydes was obtained and amounted to, depending upon the methyl pyridine employed, between 30% and 50% of the theoretical.

Also, a simpler method of working up the vapors leaving the aluminum reactor is as follows:

The vapors were condensed and the resulting liquid cooled to room temperature and subsequently shaken out several times with chloroform. The chloroform was then distilled off from the pyridine aldehyde containing chloroform layer and the methyl pyridine was separated from the pyridine aldehydes remaining by vacuum distillation. The pyridine aldehydes were then separated by fractional distillation.

When the starting material was 2.6 lutidine, the residue after distillation of the chloroform and lutidine from the chloroform exhause was frozen out in ice water, suction filtered and frozen out and suction filtered again to obtain 2.6 pyridine dialdehyde having a melting point of 124° C. (after recrystallizing from benzol).

The remaining mother liquor was subjected to vacuum distillation and the 6-methyl-2-pyridine-2-aldehyde which distilled over at 77–78° C. at a pressure of 12 mm. Hg was collected. The melting point of this substance is 30° C. The yields obtained were 18% of 6-methyl-pyridine-2-aldehyde and 12% of 2.6 pyridine dialdehyde with reference to the lutidine used.

*Example 2*

125 ccm. of a catalyst which contained 28 g. $V_2O_5$ and 6 g. $MoO_3$ per 200 g. were placed into an aluminum reactor. The catalyst was preheated to 410° C. and at this temperature a mixture 10% by weight of $\alpha$ picoline and 90% by weight of steam, and air was passed over such catalyst so that the space velocity with reference to the total volume of the reaction gas mixture was (a) 5000, (b) 20,000, (c) 40,000. The quantity of air used in (a) furnished 1 mol of oxygen per mol of $\alpha$ picoline and in (b) and (c) it furnished 2 mols. The vapors leaving the reactor were cooled and the condensate extracted with chloroform. After distilling off the chloroform from the resulting extract at normal pressure, the residue was vacuum distilled. The excess picoline was recovered and could be recycled. Under condition (a) 8 g. of $\alpha$ pyridine aldehyde were recovered and under condition (b) 35 g. and under condition (c) 68 g. The yield amounted to 50–70%.

*Example 3*

A mixture of 3% by weight of $\alpha$ picoline and 97% by weight of steam admixed with a quantity of air to provide 1.75 mol of oxygen per mol of picoline was passed through the reactor described in Example 2 at a space velocity of 20,000. 30 g. of $\alpha$ pyridine aldehyde were recovered per hour with a yield of 65–70%.

*Example 4*

The vapors of 200 grams of a 3% aqueous solution of $\beta$ and $\gamma$ picoline in admixture with 10 liters of air were passed at 415° C. per hour over a catalyst produced by impregnating 100 cubic centimeters of silica gel with 10% of manganese chloride, treating the impregnated product with ammonia and then drying for several hours at 400° to 500° C. The reaction product contained $\beta$ and $\gamma$ pyridine aldehydes.

*Example 5*

100 ccm. of silica gel containing 14 g. $V_2O_5$ and 6 g. $MoO_3$ were prepared. A mixture of the vapors of 19.5 g. collidine, 370.5 g. of water and 50 liters of air was passed over 12.5 ccm. of this catalyst per hour at a temperature of 410° C. The vapors leaving the catalyst were condensed and extracted several times with chloroform. The chloroform was distilled off from the extract and the excess collidine in the residue removed. Upon fractional distillation of the residue, 4.6 dimethyl-pyridine-2-aldehyde distilled over at 74–77° C. at 5 mm. Hg pressure. After cooling the residue crystals precipitated out with a melting point of 88–100° C. Upon sublimation they possessed a melting point of 103–105° C. and were composed of 4-methyl-2,6-pyridine dialdehyde.

*Example 6*

A catalyst was prepared by impregnating 100 cubic centimeters of silica gel with 10 grams of ammonium molybdate and then drying and calcining the impregnated silica gel. The resultant catalyst was then placed in an aluminum tube and a vapor mixture composed of 25 grams of α picoline, 75 grams of steam and 25 liters of air was passed over this catalyst per hour at 380° C. The vapors leaving the aluminum tube were cooled to 50–60° C. and, upon standing, α pyridoine of a melting point 156° C. crystallized out of the condensed liquid and were removed by suction filtration. The yield is 30%. The excess picoline which simultaneously contains some pyridine was recovered and passed over the catalyst again.

*Example 7*

A vapor mixture composed of 25 grams of a pyridine fraction having a boiling point between 142.5° C. and 145° C., 75 grams of steam and 25 liters of air were passed per hour at 410° C. over a catalyst composed of 100 cubic centimeters of silica gel containing 14 grams $V_2O_5$ and 6 grams of $MoO_3$ arranged in a nickel tube. The vapors leaving the catalyst were condensed and upon standing 2.6-dimethyl pyridoine of a melting point of 198° C. separated out. The remaining oily layer contained β and γ pyridoines and excess pyridine bases.

This application is a continuation-in-part of our application Ser. No. 251,624, filed October 16, 1951 now abandoned.

The pyridine aldehydes produced according to the invention can be used as starting materials in the preparation of pharmaceutical products. They are especially reactive and can be reduced to the corresponding carbinols. They also undergo the Cannizaro reaction, react with substances containing an —$NH_2$ group to produce Schiff bases and also react with Grignard compounds. Pyridine-3-carbinol has been used to dilate blood vessels (Hoffmann-La Roche, Danish Patent 74,086). A laxative is prepared from pyridine-2-aldehyde (Thomae, see L. Schmidt, Arzneimittel-Forschung 3, 19–23 (1953)).

We claim:

1. A process for producing at least one compound selected from the group consisting of pyridine aldehydes and their dimerization products which comprises passing methyl pyridine in admixture with steam and an oxygen containing gas in the vapor phase through a reaction space containing an oxidation catalyst comprising at least one metal oxide selected from the group consisting of oxides of metals of subgroup A of groups V, VI and VII of the periodic system at a temperature between 250° C. and 450° C., the quantity of oxygen in such gas mixture being at most equal to X moles per mol of methyl pyridine where $X=(4.06-2.02\cdot\log.p)\cdot(S+1.4)$ in which $p$ is the per cent by weight, expressed as a whole number of methyl pyridine in the admixture of methyl pyridine and steam and S is the space velocity divided by 10,000 and recovering such compound from the reaction mixture leaving the reaction space.

2. A process according to claim 1, in which the gas mixture is passed over the catalyst at a space velocity of between 10,000 and 40,000, the quantity of steam in such gas mixture is 85 to 97% by weight in the methyl-pyridine-steam admixture and the oxygen content of the gas mixture is 0.2 to 4 mols per mol of methyl pyridine.

3. A process according to claim 1, in which the methyl pyridine is a picoline.

4. A process according to claim 1, in which the methyl pyridine is a 2,6 dimethyl pyridine.

5. A process according to claim 1, in which the temperature employed is between 370 and 420° C.

6. A process for producing at least one compound selected from the group consisting of pyridine aldehydes and their dimerization products which comprises passing methyl pyridine in admixture with steam and an oxygen containing gas in the vapor phase through a reaction space containing an oxidation catalyst comprising at least one metal oxide selected from the group consisting of oxides of metals of subgroup A of groups V, VI and VII of the periodic system at a temperature between 250° C. and 450° C., and out of contact with iron oxide and copper oxide, the quantity of oxygen in such gas mixture being at most equal to X moles per mol of methyl pyridine where $X=(4.06-2.02\cdot\log.p)\cdot(S+1.4)$ in which $p$ is the per cent by weight, expressed as a whole number of methyl pyridine in the admixture of methyl pyridine and steam and S is the space velocity divided by 10,000 and recovering such compound from the reaction mixture leaving the reaction space.

References Cited in the file of this patent

UNITED STATES PATENTS

| | | |
|---|---|---|
| 2,300,741 | Cislak | Nov. 3, 1942 |
| 2,437,938 | Cislak | Mar. 16, 1948 |

OTHER REFERENCES

Lewis and Brown: Ind. and Eng. Chem. 36, 893–96.
Lenart: Berichte 47: 808–10 (1914).